United States Patent [19]

Connell

[11] 4,414,013

[45] Nov. 8, 1983

[54] METHOD OF MAKING BLACK GLASS BY UTILIZING INCINERATED WASTE GLASS

[76] Inventor: David A. Connell, 747 Dividing Rd., Severna Park, Md. 21146

[21] Appl. No.: 372,025

[22] Filed: Apr. 26, 1982

[51] Int. Cl.$^3$ .............................................. C03B 5/08
[52] U.S. Cl. ........................................ 65/28; 65/134; 65/136; 501/155
[58] Field of Search ..................... 501/155, 70; 65/28, 65/22, 134, 136

[56] References Cited

U.S. PATENT DOCUMENTS

| | | |
|---|---|---|
| 2,576,565 | 11/1951 | Brown . |
| 3,354,245 | 11/1967 | Foster . |
| 3,900,303 | 8/1975 | Mackenzie ............................ 65/22 |
| 3,907,582 | 9/1975 | Walter . |
| 3,944,352 | 3/1976 | Morgan ............................ 65/134 X |

FOREIGN PATENT DOCUMENTS

| | | |
|---|---|---|
| 5671 | of 1906 | United Kingdom . |
| 244358 | 12/1925 | United Kingdom . |
| 1412545 | 11/1975 | United Kingdom ............... 65/134 |
| 289064 | 12/1970 | U.S.S.R. . |
| 415242 | 11/1974 | U.S.S.R. . |

*Primary Examiner*—Robert L. Lindsay, Jr.
*Attorney, Agent, or Firm*—Schwartz, Jeffery, Schwaab, Mack, Blumenthal & Koch

[57] ABSTRACT

A process and a product made by the process for producing black glass from incinerated municipal waste including separating metal, stone and ash from the waste; melting the glass material comprising ferrous oxide and ferric oxide to convert at least a portion of the iron oxides to $Fe_3O_4$, thereby causing the black coloration; and thereafter solidifying the molten glass.

18 Claims, No Drawings

METHOD OF MAKING BLACK GLASS BY UTILIZING INCINERATED WASTE GLASS

BACKGROUND OF THE INVENTION

1. Field of the Invention

This invention relates to making black glass by utilizing waste glass recovered from the residue of municipal trash burning incinerators and the like. The invention produces black glass that possesses properties of heat absorption and transmissivity of solar rays.

Incineration is a primary form of solid waste disposal, especially in large cities, whereby trash is burned under temperatures ranging from 1400° F. to 2000° F. Upon completion of incineration of the trash, a residue remains that is comprised for the most part of unburnable objects. Depending on weather patterns, efficiency of the incinerator, and trash collection standards, the residue may also contain burnable, but only partially burned objects, such as carpets, phone books, and organic matter.

Analysis of the content of typical municipal incinerator residue, as conducted by the U.S. Bureau of Mines, shows the following composition on a dry basis and assuming a complete burnout:

| | |
|---|---|
| wire and large iron | 3.0% |
| tin cans | 13.6% |
| small ferrous metals | 13.9% |
| non-ferrous metal | 2.8% |
| glass | 49.6% |
| ash | 17.1% |

(See Bureau of Mines Information Circular 8533, Cost Evaluation of a Metal and Mineral Recovery Process for Treating Municipal Incinerator Residues, 1971, pp. 2–3).

While raw trash content may vary from area to area, and city to city, incinerator residue is generally consistent. (See Bureau of Mines Circular 8533, p. 2) Only the proportions of the contents may vary slightly from community to community.

This residue has always been a disposal problem, and cities typically landfill the residue. There exists a number of practices for separating the ferrous metals from the residue for recycling. The U.S. Bureau of Mines and the U.S. Department of Transportation have also sponsored research into uses of incinerator residue for making glass wool, bricks, blocks, and also as an aggregate in highway construction materials. (See U.S. Bureau of Mines Information Circular 8533; an Federal Highway Administration Report No. FWWA-RD-79-83, *Evaluation of the Economic and Environmental Feasibility of Using Fused and Unfused Incinerator Residue in Highway Construction*, April, 1979).

2. Prior Art

U.S. Pat. No. 3,907,582 uses residue from a refuse incinerator for an asphaltic road composition. Also, some incinerator residue is used directly as a sub-base course and soil stabilization resource. Yet, there is still only a very small amount of recycling of the incinerator residue, with most residue still being landfilled.

Previous research and applications have involved separation, sorting, and processing of incinerator residue components for use in other materials (e.g., glass wool, bricks, asphalt, etc.) There has been no previously known application that transforms the waste glass component into a black glass material that is especially suitable for use in the field of solar energy.

The prior art has established the use of waste materials in the production of ceramic and glass bodies. U.S. Pat. No. 2,576,565 relates to the use of waste fly ash material from coal burning plants for making ceramic products such as bricks, tiles, or pipes. Russian Pat. Nos. 289,064 of 1970 and 415,242 of 1974 teach the use of ash and slag recovered from steel making and power station furnaces, with additives, to produce black colored glass useful as building materials. Great Britain Pat. Nos. 5,671 of 1906 and 244,358 of 1925 cover the use of refuse ashes and town refuse components for the manufacture of blocks and other building glassware.

None of the known prior art teaches the use of municipal incinerator residue waste glass to produce black glass. U.S. Pat. No. 2,576,565 burns out carbon to cause a red coloration for ceramics made from waste fly ash. The Russian Patents use additives to slag and fly ash from power stations to create black glass. The British Patents use incinerator residue glass finely ground as a binder in making glass and building blocks. The British Patents do not result in black glass; the Russian Patents do not use waste glass from incinerated trash; and U.S. Pat. No. 2,576,565 results in a red product.

OBJECTS AND SUMMARY OF THE INVENTION

The present invention involves the production of black glass from waste glass contained in the residue of trash burning incinerators, by melting the glass and causing a chemical conversion of the iron oxides into magnetite.

One object of the invention is to provide a black glass material that is suitable for use in solar energy because of newly created properties of heat absorption and transmissivity of solar rays. The magnetite composition of the glass creates a black coloration that achieves heat absorption characteristics. The glass itself contains the characteristics of transmissivity and heat conduction. The combination of these characteristics, as achieved by the melting of waste glass derived from trash incineration, presents a material that can be formed and shaped for use in solar energy applications, such as solar collector mediums, structural tiles, panels, and furniture.

Another object of the invention is to provide for the productive and commercial use of waste materials recovered from the residue of municipal trash burning incinerators.

Still another object of the invention is to provide black glass from a new source of material, without having to use virgin materials or original resources.

DETAILED DESCRIPTION OF THE INVENTION

The present invention involves the production of black glass from waste glass recovered from trash burning incinerators. The black glass is obtained by a chemical conversion of the ferrous oxides (FeO) and ferric oxides ($Fe_2O_3$) to magnetite ($Fe_3O_4$) that is caused when the waste glass is melted.

The waste glass fraction of incinerator residue is derived from an assortment of glass that virtually covers the entire range of glass products that may be disposed of as trash. The major concentration of glass present in the residue, however, is from glass containers such as beverage bottles, jars and glasses. In essence, the glass fraction is of a lower grade quality, which will contain higher proportions of ferrous oxides. When this glass is mixed in trash and placed in the incineration process, with temperatures of 1600° F. or more, and instant cooling from quenching in water, the glass takes on additional amounts of ferrous and ferric oxides because of iron contamination from the other components of the trash, such as tin cans, rusting iron and steel, and paper. The U.S. Bureau of Mines has shown the comparative analysis between unincinerated and incinerated glass to be as follows:

|  | Incinerator Residue Glass | Unincinerated Glass |
|---|---|---|
| $SiO_2$ | 64.80 | 69.30 |
| $Al_2O_3$ | 2.50 | 1.74 |
| $Na_2O$ | 14.20 | 13.91 |
| CaO | 7.60 | 10.02 |
| MgO | 2.00 | 0.43 |
| $Fe_2O_3$ | 5.70 | 0.86 |
| $K_2O$ | 0.50 | 0.55 |
| $Cr_2O_3$ | 0.05 | 0.03 |

(See Bureau of Mines Report of Investigations #7708, *Glass Wool from Waste Glass*, 1972, p. 2).

The ferric oxides in incinerator residue may even range as high as fifteen percent as shown in other samples analyzed by the Bureau of the Mines. Under incineration conditions, the ferric oxides combine with ferrous oxides, but the appearance of the glass does not change, aside from becoming slightly soft. After incineration, the waste glass, when subjected to melting conditions and cooling, which makes the cullet a homogenous substance, turns black due to conversion of the ferrous and ferric oxides to magnetite, which is a black, isometric, iron ore which occurs at temperatures exceeding 1300° C. The ferric oxides are reduced to $Fe_3O_4$ by hydrogen at 500° C. or more. This conversion to a black body occurs for samples of waste glass melted from different communities, such as Harrisburg, Pa.; Baltimore, Md; and Washington, D.C. The conversion also takes place for samples collected at different times of the year.

The production of black glass through this conversion occurs even when in the presence of soot and ash, except that the greater the proportions of soot and ash to waste glass when melting, the more brittle and less desirable the black glass becomes.

It should be noted that mixed unincinerated glass, when melted under the same circumstances, even if soot and ash is mixed throughout, does not form a black glass, but rather a green and amber tinged body.

PROCESSING WASTE GLASS FROM INCINERATOR RESIDUE FOR PRODUCTION OF BLACK GLASS

Incinerator residue, when discharged from the incinerator, consists of metals, glass, ash, miscellaneous inorganic matter such as stone and ceramics and partially burned objects. The waste glass is found in fragments due to crazing and shattering during the heating and cooling process of incineration and quenching inside the incinerator. Pieces of glass ranging from 2" to 0.3 mm are mixed with the other components of the residue.

The best mode for making the black glass from the incinerator residue is believed to be a six-step process.

Step 1.: Separation

The first step is to separate the glass fraction from the other components of the residue. This is best accomplished by removal of ferrous metals by a magnetic separator being passed over the residue, and then screening the remaining portion to capture pieces in size between 2" and 4 mm. Through this screeing, the retained matter will consist mostly of glass fragments, but also of small pieces of metal, ceramics stone and other miscellaneous matter.

Step 2.: Loading

The next step is to load the retained glass and assorted matter into a crucible. The crucible must be constructed of a material that can withstand high temperatures exceeding 1500° C., such as a clay-bond graphite or iron-free stoneware clay. Although not necessary, it is desirable to use a crucible, or coat a crucible, to prevent bonding of the glass to the walls and floor, and to allow for easy unloading of the glass after melting and cooling.

Step 3.: Melting and Stratification

The crucible is then placed into an oven, kiln, or other heating chamber, and fired to a temperature sufficient to bring the glass to a molten state and homogeneous mixture. This may be accomplished in a temperature range of 1300° C. to 1500° C., but the best temperature for rendering a state of homogeneous and molten glass is about 1430° C., to be held for about a three hour time period. This melting process will produce a stratification of the mixture, with the undissolved inorganics (such as stone, shells, etc.) rising to the top layer, metals concentrating at the bottom, and the middle will be a clean black glass material.

Step 4.: Cooling

The stratified mixture must be cooled slowly in the heating chamber by shutting off the firing mechanism, and allowing the mixture to cool by a natural and gradual decline to normal room temperature. The cooling process should be over a twelve to sixteen hour period, before exposing the mixture to the atmosphere outside of the heating chamber.

Step 5.: Cullet Extraction

Once cooked, the mixture may be unloaded or broken from the crucible and fragmented into three parts: a top layer of extraneous and undissolved matter; a middle layer of clean black glass; and a bottom layer of concentrated metals. The extraneous mattr and the metals concentrate are to be removed, and the black glass layer is then used as a cullet for remelting and forming into desired shapes.

Step 6.: Remelting, Shaping and Annealing

The black glass cullet is then reloaded into a crucible made of high temperature material and placed into a heating chamber for melting. The cullet is then fired at a temperature to remelt, which temperture is in a range of 1300° C., to 1500° C., but the best level is about 1300° C. This temperature must be held for atleast 2 hours, but is desired to be held for an extended time of about 16 hours. The extended melting conditions allows oxidizing reactions to stabilize, preventing surface bubbling for any form or object that is shaped. Otherwise, at shorter melting periods, the chemical conversion of the ferrous and ferric oxides cause a gaseous reaction and release that causes bubbling at the surface level.

The glass mixture in the molten state is then poured into molds for shaping as desired, such as in the form of tiles, blocks, or troughed plates. After a brief period of about 30 seconds to set up, the glass form is then unloaded onto a setter and placed into an annealer for a minimum of one hour at an annealing temperture of about 580° C. The form is the allowed to cool gradually in the annealing chamber.

SOLAR COLLECTOR

One form that the black glass material can take is as a generally conventional flat plate solar collector where the black glass can act as the absorber plate and by providing passageways therein for the flow of air or water through the body of the glass. This structure can replace the need for conventional heat absorbing material such as aluminum plates and copper tubing. The heat absorption properties of the black glass can transmit heat directly to the passing medium. Passageways may be made by etching out grooves, troughs, or canals throughout the infterior body of a black glass flat plate collector. Alternatively, the passageways may be molded into the body during formation.

While several embodiments of the invention have been described, it will be understood that it is capable of still further modifications and this application is intended to cover any variations, uses, or adaptations of the invention, following in general the principles of the inventions and including such departures from the present disclosure as to come within knowledge or customary practice in the art to which the invention pertains, and as may be applied to the essential features hereinabove set forth and falling within the scope of the invention or the limits of the appended claims.

I claim:

1. A process for producing black glass comprising:
   (a) reclaiming glass material including ferrous oxide and ferric oxide from incinerated municipal waste,
   (b) melting said glass material in the range from about 1300° C. to about 1500° C. to convert at least a portion of the iron oxides therein to $Fe_3O_4$, thereby causing black coloration of the glass material and stratifying the mixture wherein one of the layers comprises a substantially homogeneous black glass,
   (c) cooling the molten glass to obtain a middle layer of substantially homogeneous black glass and a top and bottom layer of non-homogenerous material, the top layer being of extraneous and undisolved matter and the bottom layer being of concentrated metals,
   (d) removing the non-homogeneous material from the substantially homogeneous black glass layer.

2. A process according to claim 1, including separating metal, stone and ash from the incinerated waste to obtain said glass material.

3. A process according to claim 2, wherein said separation step is completed prior to said melting step.

4. A process according to claim 2, wherein said separation step is effected by screening.

5. A process according to claim 4, wherein material having a particle size less than 4 mm or greater than two inches is removed from said glass material by said screening.

6. A process according to claim 2, wherein said separation is effected at least in part by magnetic separation.

7. A process according to claim 1, wherein said glass material comprises from about 5 to about 15 weight percent iron oxides.

8. A process according to claim 1, wherein said melting is effected at a temperature of about 1430° C.

9. A process according to claim 1, including remelting the substantially homogeneous black glass, shaping the remelted glass into a desired shape and annealing in the desired shape.

10. A process according to claim 1 including maintaining said temperature for about three hours.

11. A process according to claim 1, wherein the solidifying is accomplished by cooling the stratified mixture to about room temperature over a period of between about twelve to sixteen hours.

12. A process according to claim 1 including remelting the substantially homogeneous black glass layer at a temperature of at least 1300° C. for at least two hours.

13. A process according to claim 12 including pouring the remelted glass into molds for shaping into a desired form and annealing the form.

14. A process according to claim 1 including the substantially homogeneous black glass and shaping the remelted glass into a solar collector.

15. A process according to claim 14 including forming passageways through the interior of the solar collector.

16. A process according to claim 15 wherein said passages are formed during said shaping step.

17. A process according to claim 15 wherein said passages are formed by etching through the interior of said solar collector.

18. A process according to claim 14 including shaping said solar collector into a flat plate.

* * * * *